United States Patent [19]

Bauer

[11] 4,139,122

[45] Feb. 13, 1979

[54] DISPENSING PUMP HAVING NO CHECK VALVES

[76] Inventor: Peter Bauer, 13921 Esworthy Rd., Germantown, Md. 20767

[21] Appl. No.: 792,262

[22] Filed: Apr. 29, 1977

[51] Int. Cl.$^2$ .............................................. B67D 5/42
[52] U.S. Cl. ...................................... 222/1; 222/321; 222/340; 417/489
[58] Field of Search .................... 222/1, 321, 340–341, 222/382–384, 385, 464, 478; 417/489; 239/331, 333

[56] References Cited

U.S. PATENT DOCUMENTS

| | | | |
|---|---|---|---|
| 173,167 | 2/1876 | Griswold | 222/385 X |
| 299,068 | 5/1884 | Griswold | 222/385 X |
| 503,232 | 8/1893 | Franklin | 222/385 X |
| 1,175,060 | 3/1916 | Hibschman | 222/385 X |
| 3,159,317 | 12/1964 | Mini | 222/385 X |
| 3,749,289 | 7/1973 | Levy | 222/385 X |
| 3,768,734 | 10/1973 | Anderson, Jr. et al. | 222/383 X |

Primary Examiner—Stanley H. Tollberg
Assistant Examiner—Fred A. Silverberg
Attorney, Agent, or Firm—Rose & Edell

[57] ABSTRACT

A dispensing pump having no check valves includes upper and lower mechanically-joined pistons which are moveable together through respective upper and lower cylinders. As the pistons are moved in one direction toward a rest position the cylinders are initially pressure-isolated and the upper piston aspirates spray liquid into the upper cylinder while the lower piston aspirates air into the lower cylinder. Before reaching the rest position the pistons unblock flow communication between the cylinders to permit liquid from the upper cylinder to fall into the lower cylinder. During movement of the pistons in the opposite direction the cylinders are again pressure-isolated and the lower piston forces liquid from the lower cylinder through a spray outlet under high pressure.

22 Claims, 6 Drawing Figures

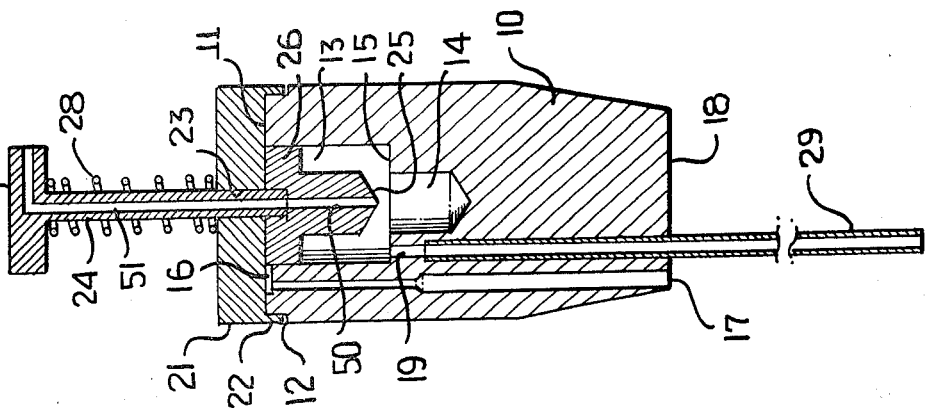
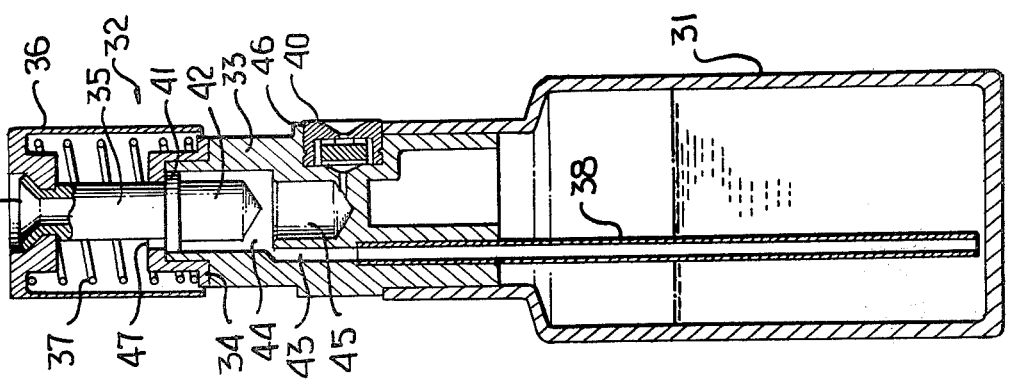
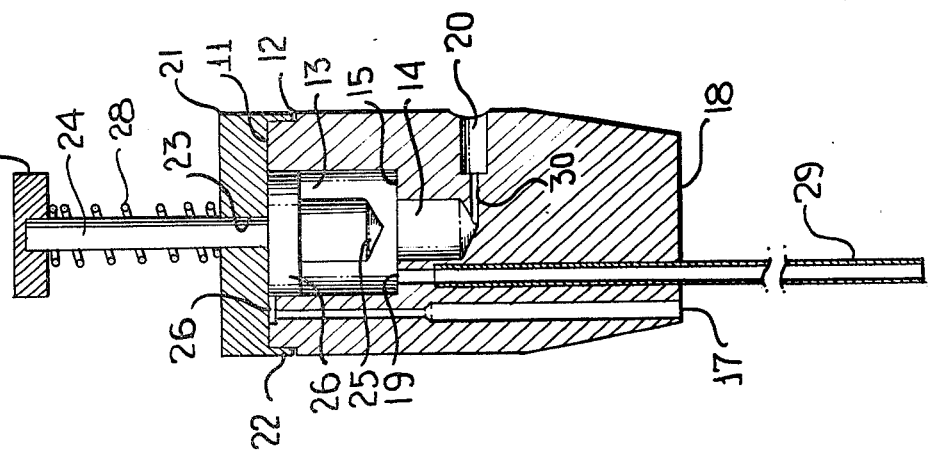

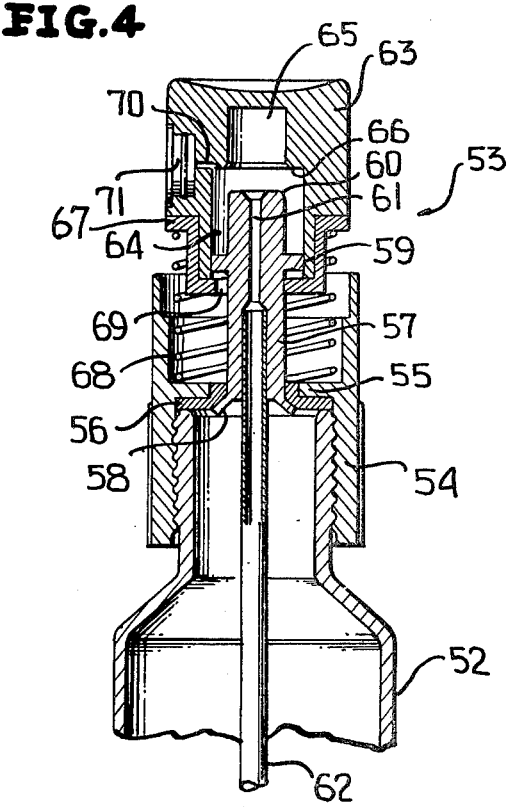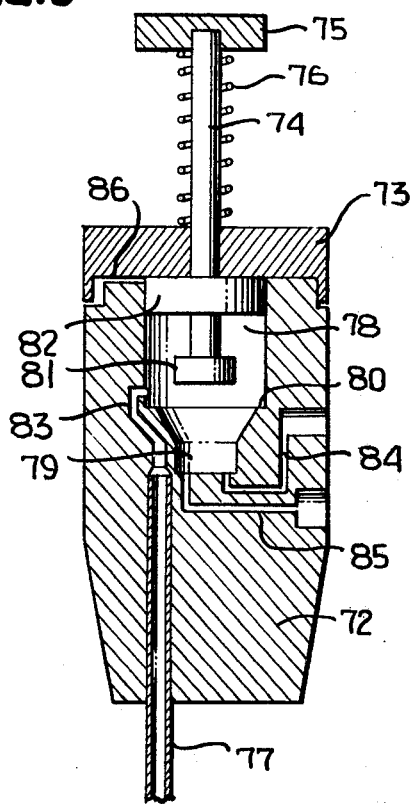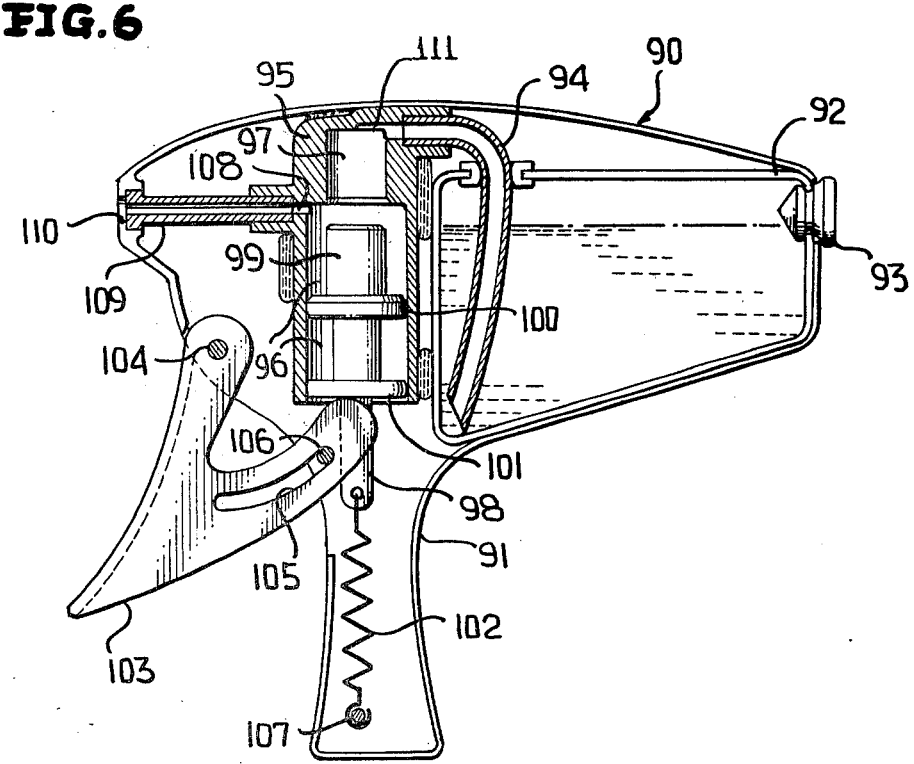

DISPENSING PUMP HAVING NO CHECK VALVES

BACKGROUND OF THE INVENTION

The present invention relates to pumps for dispensing liquids and, more particularly, to a manually actuated pump having no check valves and a minimum number of parts, yet which is capable of developing sufficiently high pressures to facilitate atomization of liquids which are considered difficult to spray. Importantly, the high pressure is developed externally of the container of liquid to be sprayed.

Present concern over the harmful effects of aerosol sprays on health and environment have led to a need for a simple replacement pump. Such a pump must be capable of being sold as a part of a container of dispensable liquid and must be sufficiently inexpensive to be feasibly discarded when the container is empty. Most otherwise suitable pumps require one or more check valves which tend to wear out and significantly reduce operating life. Others require numerous parts and are costly to manufacture, often rendering the pump more costly than the material to be sprayed. Still other pumps develop high pressures within the container of liquid, thereby requiring re-enforced and expensive containers.

It is therefore an object of the present invention to provide an inexpensive hand-operated pump serving as a seal for a liquid container and which develops high pressures in the pump but not in the container.

It is another object of the present invention to provide an inexpensive pump requiring no check valves.

It is a further object of the present invention to provide an inexpensive pump having a minimum number of parts with only one part being movable.

It is still another object of the present invention to provide an efficient spray pump which is capable of mass production by injection molding techniques.

SUMMARY OF THE INVENTION

In accordance with a preferred embodiment of the present invention, a pump body member serves as a cap atop a liquid container and includes an internal working chamber. The working chamber has a narrow end and a wide end and is sub-divided into two pressure-isolated sub-chambers by a wide piston segment which has the same cross-section as the wide chamber end but is considerably shorter. A narrow segment of the piston has the same cross-section as the narrow chamber end. A first of the sub-chambers always includes the narrow chamber end; the second sub-chamber always includes the wide chamber end. A vent passage communicates between the second sub-chamber and either ambient or air above the surface of liquid in the container. A fluid supply passage extends from below the liquid surface to the first sub-chamber. An actuator rod, secured to the piston, extends out through the body member and is spring biased to urge the piston away from the narrow end of the chamber. A spray passage communicates between ambient and a location in the first sub-chamber which is below the supply passage inlet. Any liquid in the first sub-chamber is forced through the spray passage by the piston when the actuator rod is forced against the spring bias by simple hand or finger actuation. In addition, this movement of the piston aspirates air into the expanding second sub-chamber. Upon release of the actuator rod the spring forces the piston away from the narrow chamber end, thereby forcing air out of the second sub-chamber. Further, the expanding first sub-chamber results in aspiration of liquid through the supply passage and into the first sub-chamber.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 1 is a view in vertical section of a pump constituting one embodiment of the present invention;

FIG. 2 is a view in vertical section of a pump and container constituting a second embodiment of the present invention.

FIG. 3 is a view in vertical section of another pump embodiment of the present invention;

FIG. 4 is a partial view in vertical section of another pump and container embodiment of the present invention;

FIG. 5 is a view in vertical section of another pump embodiment of the present invention; and FIG. 6 is a view in vertical section of a squirt gun embodying the pump of the present invention.

DESCRIPTION OF THE PREFERRED EMBODIMENT

Referring specifically to FIG. 1 of the accompanying drawings, a pump according to the present invention includes a body member 10, cover 21, piston 24, actuator 27, bias spring 28, and dip tube 29. Body member 10 is adapted to serve as a cap for a container of liquid (not shown); in its illustrated form, body member 10 is a plug, the bottom of which can be forced into a bottle mouth. The top surface 11 of body member 10 is circumferentially recessed to form an annular shoulder 12. Cover 21 includes a depending annular rim which fits over top surface 11 and rests against annular shoulder 12 of body member 10. A bore in body member 10 through top surface 11 is covered by cover 21 to define a chamber having a wide upper chamber or cylinder 13 and a narrower lower chambers or cylinder 14. An annular shoulder 15 defines the transition between the two chambers. Lower chamber 14 is cylindrical throughout most of its length but may taper, as shown, in a substantially conical configuration at its lower end. A shallow recess 16 is defined in top surface 11 extending from the periphery of upper chamber 13 to a bore 17 which extends vertically through the entire body member 10. Bore 17 serves as a vent passage in a manner to be subsequently described. Another bore 19 is defined through body member 10 from annular shoulder 15 to the bottom of the body member. Dip tube 29 is force-fitted into bore 19 and extends to the bottom of the container of liquid with which the subject device is used. Dip tube 29 and bore 19 serve as a liquid supply passage in a manner to be described subsequently. An outlet opening 20 extends from the lower chamber 14 through the body member 10 to ambient. The particular location at which outlet opening 20 communicates with the chamber is important only in that it must be lower than the point at which bore 19 enters the chamber.

A central hole 23 is defined vertically through cover 21 and is of a size to permit an elongated upper rod portion of piston 24 to slide therein. The lower portion of piston 24 includes a bottom piston 25 which is contoured to match lower cylinder 14. Between bottom piston 25 and the rod portion of piston 24 is an upper cylindrical piston member 26 having the same horizontal cross-section as upper cylinder 13 but which is considerably shorter than that chamber end. Upper piston 26 effectively divides the chamber into two pressure-sealed sub-chambers which change in size differentially as the piston is moved. The upper sub-chamber, located above the upper piston 26, always communicates with vent passage 16, 17; except, of course, when the piston is in its uppermost position in which case the upper sub-chamber has zero volume and the upper piston 26 seals the vent passage. The lower sub-chamber, located below upper piston 26, always communicates with fluid supply passage 19, 29 and with outlet opening 20; except, of course, when the piston is in its lowermost position in which case the lower sub-chamber has zero volume and the supply passage and outlet openings are sealed.

Actuator 27 is threadedly (or otherwise) engaged to the top of piston 24 to facilitate downward stroking of the piston with one's finger. For this purpose actuator 27 may be configured in any of the well-known shapes consistent with such operation. It is to be understood, of course, that any mechanism for effecting piston actuator may be employed, including trigger mechanism of the type commonly sold with household cleaning fluid pumps and containers.

Bias spring 28 is a helical compression spring which is wound about the rod of piston 24. The spring biases the piston to its uppermost position which is defined when upper piston 26 abuts cover 21. From this it may be seen that upper piston 26 and lower piston 25 are captive within the working chamber at all times. Of course, appropriate gasketing and O-rings may be employed as necessary to effect sealing.

In addition to the foregoing structure, it may be desirable for some applications to provide means to lock the piston assembly in its lowermost position. Mechanisms for achieving this are conventionally used and serve to prevent leakage of liquid from the container during shipping when the container may be inverted. Sealing is achieved by the fact that bottom piston 25 fully seals the spray passage 20 from supply passage 19 when the piston is in its lowermost position. Alternatively, of course, another prevailing commercial practice of providing a separate cap to seal the container may be employed, whereby the purchaser removes the cap and inserts the pump after purchase.

In operation, assume the piston to be in its upper-most position, as shown in FIG. 1, with no spray fluid in cylinders 13 and 14. If actuator 27 is pressed down, forcing the piston members 25 and 26 downward against the bias of spring 28, the upper sub-chamber, above piston 26, expands while the lower sub-chamber, below that piston, contracts. As the upper sub-chamber expands, air from above the fluid level in the container is aspirated through vent passage 17, 16 and into the upper sub-chamber. Air in the lower sub-chamber is initially forced out through spray passage 20 and down through dip tube 29 to the bottom of the spray fluid in the container from which point the forced air forms bubbles and rises to above the fluid surface. As the piston continues moving downward it wil reach a point where bottom piston 25 enters lower chamber 14, thereby sealing off the lower chamber from upper chamber 13; for the remainder of the downward piston stroke, only air in the lower chamber 14 is forced through spray passage 20 while only air in upper chamber 13 (but below piston 26) is forced through the dip tube 29. Upon reaching the bottom of its downward stroke, piston 25 seals spray passage 20, piston 26 seals supply passage 19, 29, and both pistons 25, 26 close off the lower sub-chamber to a zero volume condition. The upper sub-chamber is then at its maxime volume and is filled with air at approximately ambient pressure.

If the actuator 27 is now released the bias force of spring 28 urges the piston upward. Piston 26, as it moves upward, forces air in the upper sub-chamber into the vent passage 16, 17 and into the container above the spray fluid level. A slight pressurization of the liquid occurs as a result of this inflow of air, thereby tending to force liquid through dip tube 29 and bore 19 into the expanding lower sub-chamber. However, the primary force acting to draw liquid into the lower sub-chamber is the aspiration effect of piston 26 as it moves upward. More specifically, during the initial portion of the upward stroke of the piston, bottom piston member 25 seals lower chamber end 14 from the rest of the expanding lower sub-chamber, thus providing pressure isolation between the lower chamber end of 13 and the lower chamber end of 14. Thus, while air is aspirated from the supply passage into lower cylinder 14, spray fluid is aspirated through the supply passage 19, 29 to the expanding lower sub-chamber portion located in upper chamber 13. As the upward piston stroke continues and bottom piston member 25 clears shoulder 15, liquid previously aspirated into upper chamber 13 drops into the lower chamber and seals spray passage 20, thereby reducing any further air inflow while permitting continued aspiration of spray fluid as the piston moves upward. When upper piston member abuts cover 21 the upward piston stroke terminates, thereby terminating inflow of spray fluid into the lower sub-chamber. At this point the lower sub-chamber contains a quantity of spray fluid ready to be sprayed upon the next downward piston stroke. The spray fluid is prevented from dripping out through spray passage 20 by the restricted segment 30 of the spray passage which creates a capillary action therein to prevent leakage. Alternatively, spray passage 20 may bend upwardly to an egress at a location above the fluid level in chamber 13, 14.

If the piston is forced down again, initially piston members 25 and 26 force spray fluid out of the lower sub-chamber through both supply passage 19, 29 and spray passage 20, with considerably more of the liquid being forced through the spray passage since it terminates in an air interface whereas the supply passage terminates in the higher impedance of the spray fluid interface at the bottom of the container. Once the bottom piston member 25 passes shoulder 15 and seals off the lower cylinder 14 from the rest of the contracting lower sub-chamber, spray fluid in the lower cylinder 14 is highly pressurized and forced to egress from spray passage 20 only. This high pressurization by lower piston member 25 within lower cylinder 14 facilitates atomization of the spray fluid. Upon completion of the downward piston stroke the lower sub-chamber is once again at zero volume while the upper sub-chamber is filled with air. Release of the piston results in an action similar to that described above, whereby the upper sub-chamber contracts and the lower sub-chamber expands to receive spray fluid. However, some portion of spray fluid, which remains in spray passage 20 upon completion of the downward piston stroke, reduces the amount of air aspirated into the lower sub-chamber during the initial portion of the upward stroke so that a somewhat greater amount of spray fluid resides in the lower sub-chamber after the second and subsequent upward strokes than is the case the first upward stroke.

It is apparent that only the small lower cylinder 14 and bottom piston member 25 are exposed to high pressure during pump operation. All of the other pump parts and the container experience only the small pressurization required to lift the liquid into the pump chambers from the container.

It is preferable that spray passage 20 have as small a volume as possible so that a minimum of spray fluid remains in the passage after the downward stroke is completed. This permits some air to be drawn into bottom cylinder 14 via passage 20 during the intial part of the upward stoke. By suitable choice of piston and chamber dimensions it is possible to empty the spray passage of all spray fluid due to return aspiration on the upward stoke; this would permit a hydraulic ram effect on the downward stroke to achieve particularly high outflow pressure pulse fronts for special spray effects, cleaning sprays. etc.

It is to be understood that spray passage can be terminated with a suitable nozzle to achieve a desired spray pattern.

The pump of FIG. 1 is made from only six parts and includes no check valves. The six parts are body member 10, cover 21, piston assembly 24, 25, 26, knob 27, spring 28 and dip tube 29. Each of these parts, except for spring 28, may be made of suitable plastic and is readily formed by injection molding techniques. It is also apparent that the finger-actuated mechanism described above may be readily converted to a trigger-actuated mechanism in the manner illustrated and described in my prior U.S. Pat. No. 4,078,725.

A second embodiment of the present invention is illustrated in FIG. 2. A container 31 for spray liquid is fitted with a pump assembly 32 which operates in accordance with the same principles described in relation to FIG. 1. The pump assembly 32 includes a body member 33, cover 34, piston 35, actuator 36, bias spring 37 and dip tube 38. In addition, assembly 32 has a swaged joint 39 for securing actuator 36 to piston 35, and a nozzle 40 for shaping the pump outflow to the desired spray pattern. Similar to body member 10 of FIG. 1, body member 33 has a two-section bore defined therein which is covered with cover 34 and forms a wide upper cylinder end 44 and a narrower lower cylinder end 45. The shoulder defining the transition between these cylinder ends has a bore 43 defined therein into which the dip tube 38 is press-fit to form the spray liquid supply passage. Piston 35 includes wide upper piston member 41 and narrow lower piston member 42, both captively engaged in the pump chamber by cover 34.

Actuator 36 is in the form of an inverted cup having a diameter slightly larger than cover 34 and body member 133. When actuator 36 is pushed downward it receives in its cup-like interior a portion of body member 33, much like a telescopic engagement. A suitable annular ridge 46 is defined in the periphery of body member 33 to serve as a stop against the rim of actuator 36 and thereby limit the downward stroke of the device.

The vent passage in pump assembly 32 differs from the assembly in FIG. 1 in that venting is to ambient rather than to the space above the spray liquid in container 31. Specifically one or more holes 47 are defined through the top wall of cover 34 to provide communication between the cup-like interior of actuator 36 and the portion of upper chamber 3nd 44 residing above wide piston member 41. The cup-like interior of actuator 36 is continuously vented to ambient due to the annular clearance between actuator 36 and both cover 34 and body member 33. Thus, during the downward stroke of piston 35 ambient air enters the expanding upper sub-chamber above piston member 41. Similarly, during the upward piston stroke, air in the upper sub-chamber is forced to ambient rather than into the container.

In all other respects, operation of pump assembly 32 is the same as described in relation to FIG. 1. Further, all of the cost and operational advantages described in relation to FIG. 1 are present in pump assembly 32.

Nozzle 40 is in the form of a button-like member which is press-fit into a suitably provided outlet bore in the spray outlet passage. The particular nozzle configuration shown in FIG. 2 is a conventional vortex nozzle which receives the pressurized pump outflow tangentially in a vortex chamber and then spins the fluid before issuing it in a substantially conical flow pattern. Any spray nozzle may be substituted for nozzle 40, depending upon the spray pattern desired.

A variation of the embodiment of FIG. 1 is illustrated in FIG. 3 wherein similar parts bear the same reference numerals as in FIG. 1. The differences between the two embodiments are two-fold. First, in FIG. 3 the actuator knob 27 and piston rod 24 form one integral part, separate from piston members 25 and 26 which form another integral part; the bottom of piston rod 24 in FIG. 3 threadedly or otherwise engages the top of wide piston member 26. Second, the outlet passage 20 through body member 10 is eliminated in FIG. 3. Instead, the outlet is formed as a central longitudinal bore 50 in piston members 25 and 26. Bore 50 communicates with a similar bore 51 extending longitudinally through piston rod 24 and then radially out through knob 27. Thus, during operation of the device of FIG. 3, liquid pressurized in chamber 14 during the downward stroke is forced upwardly through bores 50 and 51 and out through knob 27. A suitable nozzle can be attached at the outlet to provide the desired spray pattern. In all other respects, the configuration and operation of the device of FIG. 3 are the same as in FIG. 1.

Referring to FIG. 4, another embodiment of the present invention is shown with a container 52 for spray fluid and a pump assembly 53. Pump assembly 53 differs structurally from the embodiments described above but operates in accordance with the same principles. A hollow cylindrical member 54, open at both ends, is divided into top and bottom interior sections by an annular shoulder 55. The bottom part of member 54 threadedly or otherwise engages the top of container 52. An annular gasket 56 is wedged between the top rim of container 52 and the lower surface of shoulder 55. A stationary piston member 57 has its bottom end press-fitted through the central opening in gasket 56 and includes a flared lower end 58 to prevent the piston from being pulled entirely through the gasket opening. Piston 57 extends through the upper end of member 54 and includes an annular projection 59 disposed about its periphery at a location below the upper end 60 of the piston. Projection 59 and upper end 60 of piston 57 serve the same piston functions attributed to members 26 and 25 in FIG. 1, a fact which is described in greater detail below. A bore 61 extends longitudinally through the entire piston 57, the bore being somewhat wider in its lower portion to permit it to receive a dip tube 62 in press-fit engagement. The dip tube 62 extends down to the bottom of container 52.

A body member 63 has a bore defined into its bottom surface, the bore having a relatively wide bottom end 64 and a narrower upper end 65. An annular shoulder 66 marks the transition between ends 64 and 65. A cover 67 is secured (by press-fit, adhesive matter, or other suitable means) to the bottom surface of body member 63. Piston 57 extends through a suitably provided hole in cover 67 such that piston member 59 and piston end 60 are disposed within the chamber defined by the bore in body member 63. The hole in cover 67 serves to permit body member 63, together with the cover, to vertically slide along piston 57 with the underside of piston member 59 serving as a stop for upward movement of the body member. Piston member 59 has its periphery contoured to provide a sliding seal in cylinder 64 so that upper and lower pressure-isolated sub-chambers are defined above and below, respectively, the piston member. The upper end 60 of piston 57 is contoured to match the shape of upper cylinder 65 so that whenever upper piston end 60 extends upward of shoulder 66, chamber ends 64 and 65 are sealed from one another. The spacing between upper piston end 60 and the upper surface of piston member 59 is substantially equal to the length of upper chamber end 65. Therefore, in the extreme downward position of body member 63, piston member 59 abuts annular shoulder 66.

A helical compression spring 68 is disposed concentrically about the piston between cover 67 and the top surface of annular shoulder 55. Spring 68 biases body member upward so that in the unactuated condition the body member is positioned such that the cover 67 abuts the bottom surface of piston member 59.

One or more vent openings 69 are defined in cover 67 to provide communication between the lower sub-chamber in body member 63 and the upper portion of cylindrical member 54. Since the latter is always open to ambient, the lower sub-chamber is always vented to ambient.

A spray outlet passage 70 is fitted with a suitable spray nozzle 71 and communicates with ambient from a region proximate shoulder 66.

In operation, it is assumed initially that there is no spray liquid in the interior of body member 63 and that the body member is in its unactuated or uppermost position. Under such circumstances, the upper sub-chamber is at maximum volume and filled with air; the lower sub-chamber is at zero volume. When body member 63 is moved downward, air in the upper sub-chamber is forced out through spray outlet passage 70 and nozzle 71 as the upper sub-chamber is contracted by piston member 59. Some air is also forced down into the liquid via bore 61 and dip tube 62, particularly the air trapped in upper cylinder 65 after piston end 60 clears shoulder 66. Simultaneously the lower sub-chamber expands and draws in ambient air through vent opening 69. At the termination of the downstroke of body member 63, the upper sub-chamber has zero volume; the lower sub-chamber is at maximum volume and is filled with air.

When body member 63 is released the bias spring 68 forces it back upward. Initially, liquid from container 52 is aspirated into the upper chamber end 65 via dip tube 62 and air is aspirated into lower chamber end 64 via outlet passage 70. When the upper end 60 of the piston clears shoulder 66, the liquid falls to the top surface of piston member 59 and liquid and air continue to be aspirated into the expanding upper sub-chamber until the bottom surface of member 59 abuts cover 67. The upper sub-chamber at such time contains a volume of liquid to be sprayed at the next pump actuation. During the upward return of the body member 63 by spring 68, air in the lower sub-chamber is forced out through vent opening 69.

The next downward stroke of body member 63 initially forces air from the upper sub-chamber out through spray passage 70 and nozzle 71 until spray passage 70 descends to the liquid level in the contracting upper sub-chamber. At that time liquid is sprayed out through passage 70 and nozzle 71, the spray continuing until the downward stroke is terminated. Thereafter, upon release of the body member 63 it is returned upward and liquid is drawn into the upper sub-chamber in the manner previously described.

Referring to FIG. 5, another embodiment of the present invention includes a body member 72 similar to body member 10 of FIG. 1. Likewise included are a cover member 73, piston 74, actuator 75, bias spring 76 and dip tube 77, all similar to their FIG. 1 counterparts. Upper chamber end 78 and lower chamber end 79 are defined as a bore into the top surface of body member 72 and are covered by cover 73. Annular shoulder 80 marks the transition between the two chamber ends. Lower chamber end 79 has a short lower cylindrical portion toward which a funnel-like upper portion converges. The bottom piston end 81 is configured to match the contour of the bottom part of lower chamber end 79. Wide piston member 82 is contoured to match the periphery of upper chamber end 78 but is considerably shorter than chamber end 78 so that piston member 82 defines two pressure-isolated sub-chambers of differentially varying volume as member 82 moves in chamber end 78.

Dip tube 77 is press-fit into bore 83 which extends to the bottom of body member 72 from the sidewall of wide chamber end 78. The length of piston member 82 and its spacing from piston end 81 is such that when the piston is in its lower-most position (i.e. with piston end 81 substantially abutting the bottom of chamber end 79), piston member 82 blocks the opening to bore 83.

Two spray outlet passages 84, 85 extend from lower chamber end 79, each passage being adapted to be fitted with a suitable spray nozzle. Clearly, any number of such spray passages and nozzles may be provided.

A vent passage 86 is defined as one or more slots along the top surface of body member 72 and extends radially outward beneath cover 73 to ambient.

Operation of the embodiment of FIG. 5 is substantially the same as that of the embodiment of FIG. 2. The presence of two or more spray outlets permits two or more spray patterns to be combined into an overall pattern, or, with additional valving means (not shown) permits selection of one or more spray patterns to be operable at a time.

Another embodiment of the invention is illustrated in FIG. 6 in the form of a spray gun 90. Spray gun 90 includes a hollow housing 91 having a liquid reservoir 92 disposed in its rearward end. A fill opening through both housing 91 and reservoir 92 is closed by a removable plug 93 of rubber or the like. An outlet opening is defined through the top of reservoir 92 so that a dip tube 94 for a pump may extend to the bottom of the reservoir. The pump, located just forward of reservoir 92, includes a body member 95 which is closed at its top and open at its bottom. A bore defined through the bottom surface of body member 95 has a relatively long and wide bottom end 96 and a relatively short and narrow upper end 97. A piston 98 is disposed to slide logitudinally in the bore through the open bottom of body member 95. The upper end 99 of piston 98 is contoured to match the narrow upper bore end 97; a wide member 100 projects annularly from piston 98 to divide lower bore end 96 into two pressure-isolated sub-chambers which vary differentially in volume as the piston moves. An annular actuator member 101 is also disposed about piston 98 at a location below piston member 100. Member 101 is a bearing of similar smaller diameter to the lower bore end 96 and serves to prevent yaw-like rotation of piston in the bore. Specifically, without member 101, the piston, at certain portions of its stroke, would contact the bore surface only at the annular edge of member 100. The piston could wobble under such circumstances so that smooth entry of piston end 99 into bore end 97 might not be achieved. Member 101 provides a second annular contact region between the piston and bore and prevents wobble. In addition, member 101 provides an actuator surface on its underside whereby the piston can be pushed upward into the bore.

A trigger mechanism 103 is pivotally engaged to housing 91 at a location forward of body member 95. Trigger mechanism is slotted at 105 to slidably engage a pin 106 secured to housing 91 such that the slot rides along the pin as the trigger is pivoted about point 104. A portion of the trigger 103 rests against the underside of member 101 such that as the trigger is pivoted in the counter clockwise direction (as viewed in FIG. 6), piston 98 is driven upwardly into the bore by the trigger. When the trigger pivots in the opposite direction the piston withdraws from the bore to the position shown. Slot 105, in conjunction with pin 106 limits the angle through which the trigger mechanism may be pivoted. A bias spring 102 is secured to the bottom of piston 98 and to a point 107 on housing 91 which is below the pump. Spring 102 acts to bias the piston 98 to the unactuated position (as shown in FIG. 6).

An outlet opening 108 is defined through housing 91 proximate the upper end of wide bore 96. An outlet tube 109 is secured between body member 95 and a spray hole 110 defined in the forward end of housing 91 to conduct outflow from the pump out of the housing 91. A suitable spray nozzle may be employed at spray hole 110 if desired. An inlet opening 111 at the top of narrow bore end 97 communicates with dip tube 94 to provide a supply of liquid from reservoir 92 to the pump.

In operation, assume the pump to be in the unactuated position as shown in FIG. 6, and that no spray liquid is in the upper sub-chamber. When the trigger 103 is pulled back the piston 98 is driven into the chamber causing the upper sub-chamber to contract and forcing air therein through outlet tube 109 and into reservoir 92 where it bubbles up to the surface. The lower sub-chamber (i.e. the chamber region below member 100), expands during the upstroke of the piston; however, since the region beneath guide member 101 is not provided with a seal, the expanding lower sub-chamber readily takes in ambient air from the housing 91 interior. It is noted that the housing interior is continuously open to ambient via an opening through which trigger mechanism 103 extends.

After the upward stroke of piston 98 is completed and trigger 103 is released, spring 102 pulls the piston down. Initially, as upper piston 99 is pulled down in the upper cylinder 97 is aspirates spray liquid from reservoir 92. During this interval air is also aspirated into the expanding upper sub-chamber via outlet tube 109. When upper piston 99 withdraws completely from cylinder 97, liquid and air continue to be aspirated into the upper sub-chamber, all of the liquid falling to piston 100. When the piston returns to its rest position a charge or volume of liquid remains standing above piston member 100, ready for spraying during the next upward stoke of piston 98.

At the next upstoke, air is initially forced from the contracting upper sub-chamber through both outlet tube 109 and dip tube 94 until the liquid level in the upper sub-chamber is pushed to the level of outlet opening 97. Thereafter, for the remainder of the upward stroke liquid is forced out through outlet tube 109 and air is forced into reservoir 92.

In its broadest aspects the invention may be viewed as comprising two cylinders (e.g. 13, 14) and two mechanically-joined pistons (e.g. 26, 25) slidable in the cylinders. (The "cylinders" and pistons of course need not be cylindrical but instead may have any cross-sectional shape consistent with the operation described.) The pistons and cylinders operate as follows:

(1) During the initial portion of the withdrawal stroke, the chambers are pressure-isolated. As the upper piston (26 in FIG. 1; 60 in FIG. 4) aspirates liquid from the supply into the upper cylinder (13 in FIG. 1; 65 in FIG. 4), the lower piston (25 in FIG. 1; 59 in FIG. 4) aspirates air from ambient into the lower cylinder (14 in FIG. 1; 64 in FIG. 4).

(2) During the end of the withdrawal stroke the cylinders are in flow communication permitting liquid from the upper cylinder to fall into the lower cylinder, and causing air in the lower cylinder to rise above the liquid.

(3) At some time during the spray stroke the cylinders are once again pressure-isolated. The lower piston (25 in FIG. 1; 59 in FIG. 4) pressurizes the lower cylinder (14 in FIG. 1; 64 in FIG. 4) to force liquid therein out through the outlet. In addition, fluid (either air or a mixture of air and residue spray liquid) is forced from the upper cylinder into the supply tube by the upper piston.

The invention as described is an inexpensive pumping arrangement, suitable for mass produced throw-away spray applications such as hair sprays, anti-perspirants, cleaning fluids, etc. All parts are preferably injection molded, but in any case are simply and inexpensively fabricated. No check valves are required and the only pressurization inside the container is the low pressure necessary to draw liquid up the dip tube and into the pump chamber during the return stroke.

The pump may be constructed in a variety of different configurations using the principles described herein, including trigger or finger actuation, horizontal or vertical actuation, etc., and is readily adapted to motor driven actuation.

While I have described and illustrated specific embodiments of my invention, it will be clear that variations of the details of construction which are specifically illustrated and described may be resorted to without departing from the true spirit and scope of the invention as defined in the appended claims.

I claim:

1. A pump for dispensing working fluid from a container without the use of check valves comprising;
    a body member;
    upper and lower chambers defined in said body member;

upper and lower mechanically-joined piston members movable together in said upper and lower chambers, respectively, through a limited travel path;

means for aspirating working fluid from said container into said upper chamber in response to movement of said upper piston member in a first direction along said path;

means for aspirating air into said lower chamber in response to movement of said lower piston member in said first direction along said path;

means for providing pressure isolation between said upper and lower chambers for all positions of said lower piston member between one end of said path and an intermediate location along said path, wherein piston movement from said one end toward said intermediate location corresponds to movement in said first direction;

means for providing fluid communication between said upper and lower chambers to permit working fluid to fall from said upper chamber into said lower chamber for all positions of said lower piston member between said intermediate location and a second end of said path; and means responsive to movement of said lower piston member in a second direction in said lower chamber for forcing working fluid from said lower chamber out of said body member.

2. The pump according to claim 1 wherein said upper and lower chambers are cylinders disposed end-to-end, wherein said piston members are cylindrical in shape, the periphery of said upper piston member being contoured to match at least a portion of said upper cylinder in a pressure-tight fit, the periphery of said lower piston member being contoured to match at least a portion of said lower cylinder in a pressure-tight fit.

3. The pump according to claim 1 further comprising:
bias means for continuously urging said piston members toward said second end of said path; and
actuator means responsive to force applied thereto for moving said piston members along said path in said second direction.

4. The pump according to claim 1,
wherein said upper and lower chambers are disposed end-to-end along said path, the lower chamber having a smaller cross-section than said upper chamber and being closed on its sides and bottom but opening into said upper chamber at its top, the upper chamber being closed on its sides and top;
wherein said lower piston member has the same cross-section as said lower chamber such that the lower piston member, when in said lower chamber, seals the lower chamber off from the upper chamber and thereby contitutes said means for providing pressure isolation;
wherein said lower piston member is withdrawn from said lower chamber when said piston members are at said second end of said path, thereby permitting fluid interchange between said chambers and constituting said means for providing fluid communicating;
wherein said upper piston member has the same cross-section as said upper chamber, and is considerably shorter than said upper chamber, such that the spaces above and below said upper piston member are pressure-isolated;
wherein said means for aspirating air into said lower chamber comprises a first fluid passage communicating between said lower chamber and ambient;
wherein said means for aspirating working fluid into said upper chamber comprises a second fluid passage communicating between said container and a location in said upper chamber which is never above said upper piston member irrespective of the position of said upper piston member along said path;
and further comprising vent means for continuously supplying air to the space above said upper piston member.

5. The pump according to claim 4 wherein said vent means comprises a third fluid passage extending from the top of said upper chamber to ambient.

6. The pump according to claim 4 wherein said body member comprises a cap for said container, and wherein said vent means comprises a bore defined through said body member to provide fluid communication between the top of said upper chamber and the space in said container above the level of said working fluid therein.

7. The pump according to claim 4 wherein said first fluid passage also comprises a spray outlet which, as part of said means for forcing working fluid, conducts pressurized spray fluid from said lower chamber to ambient.

8. The pump according to claim 7 wherein said first fluid passage is a bore defined through said body member between said lower chamber and ambient.

9. The pump according to claim 7 wherein said first fluid passage is a bore defined through said piston member from the bottom of said bottom piston member to ambient.

10. The pump according to claim 1,
wherein said means for aspirating air into said lower chamber comprises a first fluid passage communicating between said lower chamber and ambient;
wherein said means for aspirating working fluid into said upper chamber comprises a second fluid passage communicating between said container and a location in said chambers which is always above said upper piston member irrespective of the position of said upper piston member along said path;
and further comprising vent means for continuously supplying air to the space below said upper piston member.

11. The pump according to claim 10 wherein said vent means comprises a fluid passage communicating between the top of said upper chamber and ambient.

12. The pump according to claim 10 wherein said body member is a cap for said container, and wherein said vent means is a fluid passage communicating between the top of said upper chamber and the space in said container above the level of said working fluid therein.

13. The pump according to claim 10,
wherein said upper and lower chamber are disposed end-to-end along said path, the upper chamber having a smaller cross-section than the lower chamber and being closed on its sides and top but opening at its bottom into said lower chamber, the lower chamber being closed on its sides and bottom;
wherein said upper piston member has the same cross-section as said upper chamber such that the upper piston member, when in said upper chamber, seals off the upper chamber from the lower chamber and thereby constitutes said means for providing pressure isolation;

wherein said upper piston member is withdrawn from said upper chamber when said piston members are at said second end of said path, thereby permitting fluid interchange between said chambers and constituting said means for providing fluid communication; and wherein said lower piston member has the same cross-section as said lower chamber, and is considerably shorter than said lower chamber, such that the spaces above and below said lower piston member are pressure-isolated.

14. The pump according to claim 13 wherein said vent means comprises a fluid passage extending from the bottom of said lower chamber to ambient.

15. The pump according to claim 14 wherein said body member comprises a cap for said container.

16. The pump according to claim 13 wherein said first fluid passage also comprises a spray outlet which, as part of said means for forcing working fluid, conducts pressurized working fluid from said lower chamber to ambient.

17. The pump according to claim 10 wherein said first fluid passage also comprises a spray outlet which, as part of said means for forcing working fluid, conducts pressurized working fluid from said lower chamber to ambient.

18. The pump according to claim 10 wherein said second fluid passage includes: a bore defined through the top of said upper chamber; and a tube communicating between said bore and said container of working fluid.

19. The pump according to claim 10 wherein said second fluid passage includes: a bore defined through said upper and lower piston members from the top of said upper piston member; and a tube communicating between said bore and said container of working fluid.

20. The method of dispensing working fluid from a container comprising the steps of:
  (a) initially pressure-isolating first and second chambers, said first chamber being disposed above said second chamber;
  (b) for at least part of the time said chambers are pressure-isolated, aspirating air into said second chamber and working fluid from said container into said first chamber;
  (c) pressure-coupling said first and second chambers to permit working fluid to fall from said first chamber into said second chamber; and
  (d) again pressure-isolating said chambers while pressurizing said second chamber to force working fluid therefrom out to ambient.

21. The method according to claim 20 wherein the aspiration of air in step (b) and the forcing out of working fluid in step (d) utilize a common flow path between ambient and said second chamber.

22. A dispensing pump for working fluid in a container, said pump comprising:
  a body member having a pumping chamber defined therein, said chamber having first and second end-to-end abutting sections, said first chamber section having a constant transverse cross-section which is larger than the transverse cross-section of said second chamber section, said chamber sections being disposed one above the other;
  a piston positioned for longitudinal movement in said chamber, said piston having a first end disposed in said chamber with a transverse cross-section equal to that of said second chamber section, said piston further including a large piston member fixedly positioned relative to said first piston end and having a transverse cross-section equal to that of said first chamber section, the length of said large piston member being shorter than the length of said first piston section, whereby the matching cross-sections of said first chamber section and large piston member create a fluid pressure seal therebetween which effectively divides said chamber into first and second pressure-isolated sub-chambers which vary differentially in volume as said piston moves longitudinally, said first sub-chamber being located on the side of said large piston member which is closest to said first piston end, and whereby the matching cross-sections of said first piston end and said second chamber section effect a fluid pressure seal therebetween when said first piston end is in said second chamber section;
  wherein the spacing between the extremity of said first piston end and the closest surface thereto of said large piston member is substantially equal to the length of said second chamber section; said first chamber section having a length greater than the length of said piston; means for limiting the longitudinal movement of said piston at a position such that all of said piston is disposed in said first chamber section;
  first flow passage means for continuously communicating between working fluid in said container and a region of said first sub-chamber which is in constant flow communication with the uppermost part of said first sub-chamber;
  means for continuously venting said second sub-chamber; and
  a flow passage communicating between ambient and a region of said first sub-chamber which is in constant flow communication with the lowermost part of said second sub-chamber, said flow passage being capable of conducting ambient air into said first sub-chamber when the pressure in said first sub-chamber is below ambient pressure and being capable of conducting working fluid to ambient when the pressure in said first sub-chamber exceeds ambient pressure.

* * * * *